Jan. 14, 1958　　B. R. BETTER ET AL　　2,819,635
POWER OPERATED, PREDETERMINED TORQUE RELEASE TOOL
Filed May 9, 1955　　3 Sheets-Sheet 1
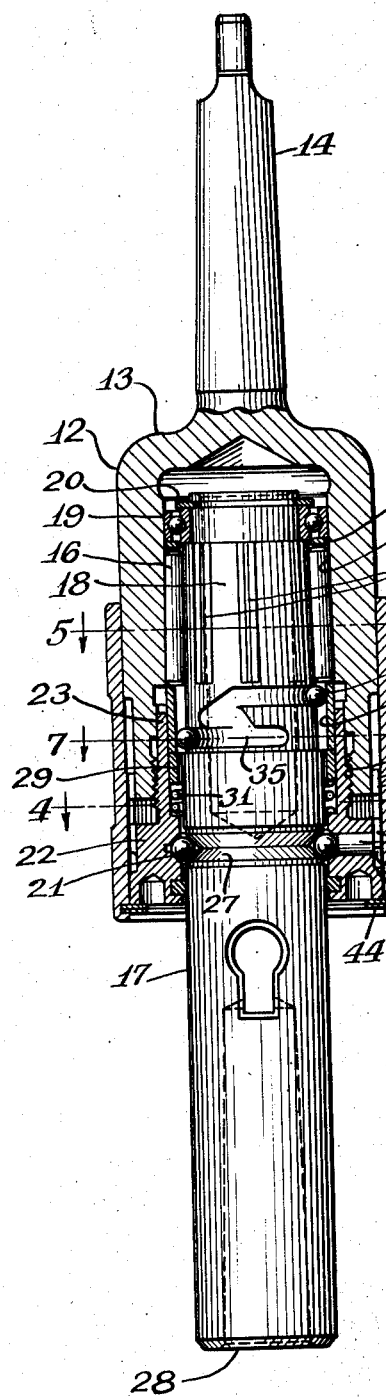
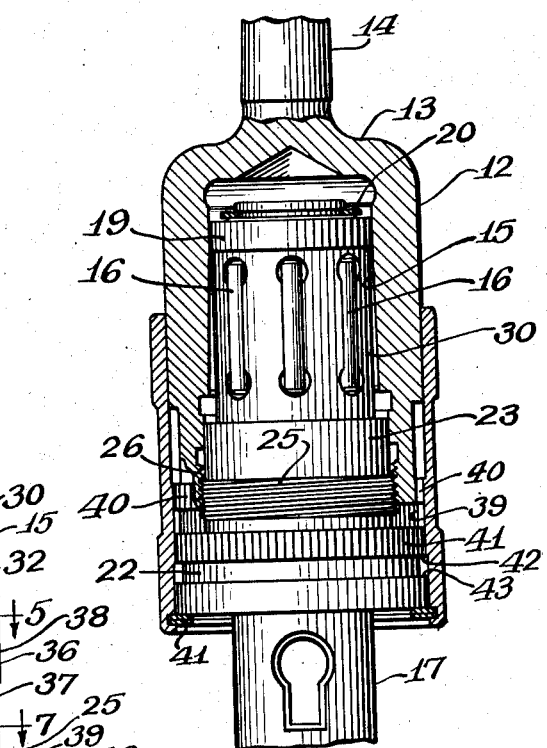
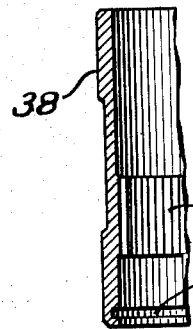
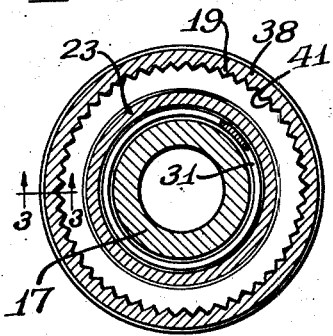
Inventors:
Bernard R. Better
John W. Lehde, Jr.
By Glenn L. Noble
Atty.

Inventors:
Bernard R. Better
John W. Lehde, Jr.
By (signature) Atty.

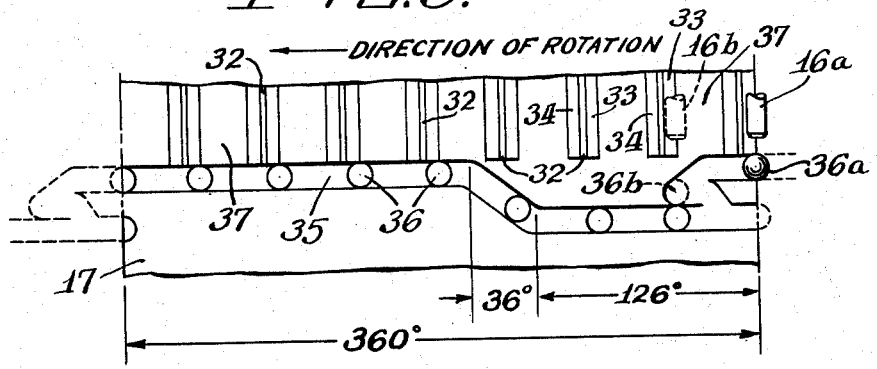
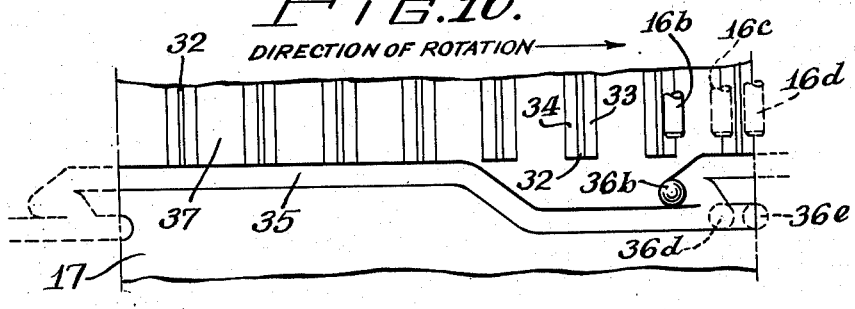
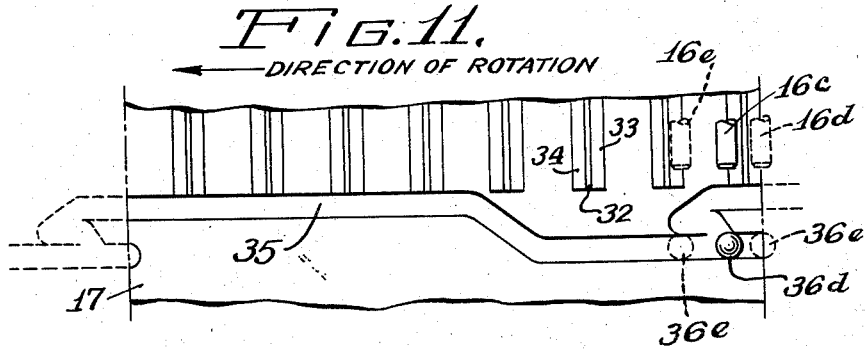

United States Patent Office 2,819,635
Patented Jan. 14, 1958

2,819,635

POWER OPERATED, PREDETERMINED TORQUE RELEASE TOOL

Bernard R. Better and John W. Lehde, Jr., Chicago, Ill., assignors to Scully-Jones and Company, Chicago, Ill., a corporation of Illinois Application May 9, 1955, Serial No. 506,708

7 Claims. (Cl. 81—52.4)

This invention is intended for driving various tools or for other purposes as will be understood from the description, but is particularly adapted for use in driving and removing taps in tapping operations and will be particularly described in this connection. It embodies novel mean for stopping the turning action on the tool when the strain reaches a predetermined or excessive amount and fully releasing the torque or twist on the tap, and also includes protective means for preventing breakage of the taps under various or unusual conditions incident to the tapping operations, and in this sense is in the nature of a super safety driver, and in actual operations has shown that it serves to protect the taps and as a consequence, large numbers of operations may be performed without any breakage.

It includes a driving member comprising an elastic shell having a tapered bore which is adapted to be expanded or deformed transversely for relieving the driving torque, the shell acting through rollers engaging with the tapered surface to drive a driven member which is correspondingly tapered for engagement with the rollers and is provided with means for attachment to the tap or other tool. The driven member is provided with driving cams which coact with the rollers but the rollers are able to leave the driving cams completely when the torque becomes excessive, by passing over high or raised portions of the cams and simultaneously deforming or distorting the elastic shell. The rollers are held in predetermined circumferential positions with respect to each other by means of a cage provided with grooves in alignment with each roller slot for receiving control balls that coact with a ball race or track in the driven member.

In general, the objects of the invention are to provide a novel safe torque driving mechanism which is adapted for actuating taps or other similar devices with little or no breakage of such tools.

Other objects and advantages will appear more fully from the following description taken in connection with the accompanying drawings in which, Fig. 1 is a longitudinal sectional view with parts broken away for convenience in illustration.

Fig. 2 is a sectional view similar to Fig. 1 but showing the cage and rollers in full position.

Fig. 3 is a sectional detail of a locking sleeve for locking the driving and driven members in adjusted positions.

Fig. 4 is a cross sectional view taken substantially on the line 4—4 of Fig. 1.

Fig. 9 is a diagrammatical view illustrating the movement of the driven member and the action of the respective balls in the cage during the operation of the driver.

Fig. 10 is a view similar to Fig. 9 showing different steps in the movement; and Fig. 11 is a view similar to Fig. 10 showing further the position of the balls during the operation.

Figure 5:
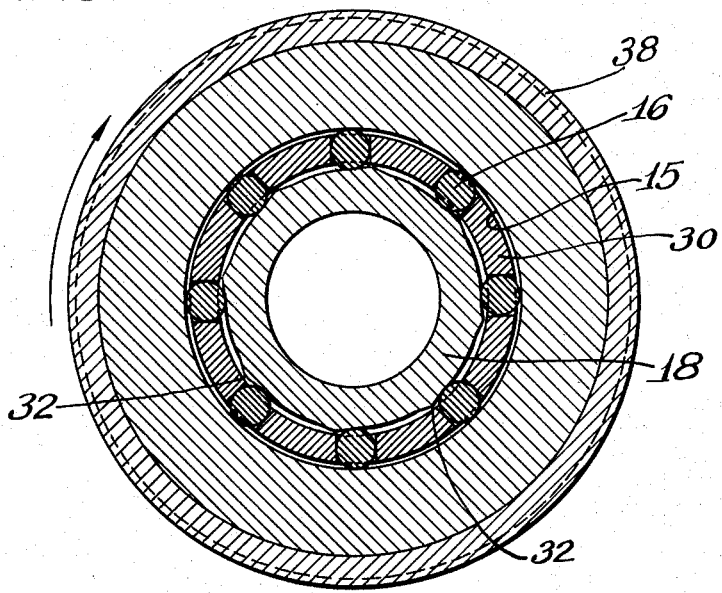
Fig. 5 is an enlarged sectional view taken substantially on the line 5—5 of Fig. 1, and illustrating the cooperation of the driving member with the driven member and other parts.

As shown in these drawings, 12 is an integral cup-shaped or cylindrical driving member formed of resilient metal so that it is adapted to expand and contract or be distorted or compressed during the operation of the driver. The central bore of the driving member is tapered or conical shaped at 15 where it engages with the driving rollers 16. One end of this driving member is closed as shown at 13 and is provided with a tang 14 or any other suitable means for connection with the machine tool or drill press to be used for actuating the same.

A driven member 17 is rotatably and axially movably mounted in the driving member as shown particularly in Fig. 1. The driven member has a tapered or conical section 18 for engagement with the driving rollers 16. One end of the driven member 17 is mounted in a ball bearing 19. The bearing and adjacent parts are held in position by means of a retaining ring 20. The driven member has a second ball bearing 21 mounted in the enlarged portion 22 of a sleeve 23, the balls being held in the ball race by a plug 24. The sleeve 23 is mounted in the end of the driving member 12 and is provided with threads 25 which engage with threads 26 in the driving member, the arrangement being such that the sleeve will have longitudinal or axial movement with respect to the driving member for the purpose of adjusting the tapered surface of the driven member with respect to the driving member. The balls 21 engage with the ball race 27 in the driven member 17, the arrangement being such that when the sleeve 23 is adjusted longitudinally by means of the threads, it will carry the driven member therewith. The bore of the sleeve 23 is somewhat larger than the adjacent portion of the driven member and provides space for an oilite ring 29 which is biased toward the roller cage 30 by a spring 31 which engages with the shoulder at the end of the enlarged portion, this spring and ring serving to provide a desired amount of friction on the cage in order to insure the proper turning of the cage at times as will be described hereinafter.

The driven member extends outwardly from the driving member and is provided at its outer end 28 with a socket or other means for attachment to the tap or tool to be driven.

The driven member is driven by means of the rollers 16 which are positioned between the tapered surface of the driving member and the tapered section of the driven member. While we have shown eight of such driving rollers, it will be noted that any desired number may be utilized and the driven member is fashioned accordingly.

Figure 6:
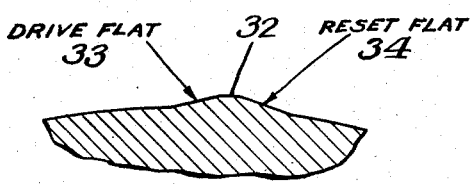
Fig. 6 is an enlarged sectional detail of one of the driving cams on the driven member showing the drive flat and reset flat which cooperate with the driving rollers.
Figure 7:
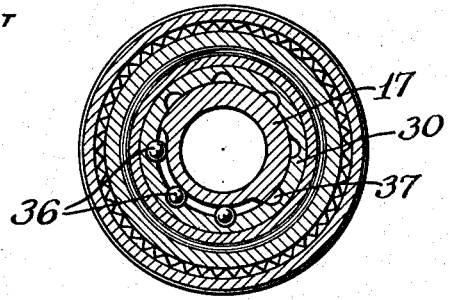
Fig. 7 is a cross sectional view taken substantially on the line 7—7 of Fig. 1.
Figure 8:
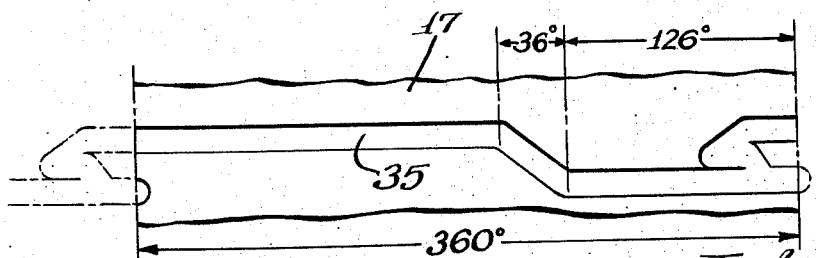
Fig. 8 is a view of the ball track or groove on the driven member which coacts with the balls in the cage, as projected on a plane or flat surface.

The driven member 17 is provided with a plurality of longitudinally arranged parallel cams or ridges 32, there being one of such cams for each of the rollers. On one side of each cam is a drive flat 33 and on the other side a reset flat 34 as shown in Fig. 6. It will be understood that these devices are manufactured by perfection engineered processes and these ridges or cams in some cases of actual construction project only a few thousandths above the surface of the driven member. The rollers are mounted in the cage 30 in the usual manner as shown and cannot change angular positions relative to each other. The driven member is also provided with a circumferential track or groove 35 for cooperating with reset balls 36 which are mounted in longitudinal slots 37 in the end of the cage 30. These balls cannot change angular positions with respect to each other, but are free to move in an axial direction in said slots, thus enabling them to follow the path of the reset ball track 35. Fig. 9 indicates more or less diagrammatically the position of the rollers and the reset ball controlling the cycle when the tool is ready to drive.

With the driving member being rotated in the clockwise direction and the driven member being retarded by an externally applied resisting torque, the friction coupling provided by the oilite ring 29 and coacting parts between the adjusting sleeve 23 and the roller cage 30 will cause the cage to be rotated with respect to the cammed portion of the driven member until the rollers contact the drive flats 33 on the cams or ridges 32.

The ball 36a and roller 16a show the position at the beginning of the cycle. As the driving member continues to turn the roller will move to the position shown in dotted lines 16b and the ball to the position shown at 36b, the ball thus holding the ball cage in fixed relation to the driven member during this movement.

The rollers then become wedged between the drive flats and the adjacent surfaces of the driving member, thus forming a positive driving connection through which torque is transmitted to the driven member.

When the resistance in the driven member becomes excessive as when a tap, for instance, reaches the bottom of a hole, the driving member will cause the rollers to pass up over the cams or ridges into depressions or free wheeling spaces 37 adjacent to the next succeeding cams.

When this occurs, the rollers will expand or deform the driving member in a radial direction. The extent of the deformation will depend in part on the character of the metal in the driving and driven members, and also the thickness of the driving member. In some instances, the deformation is not transmitted to the outside diameter of the driving member, but is confined to the immediate vicinity of the roller contact areas and no appreciable deformation of the surface of the shell or driving member can be noticed. When the rollers are in the "free wheeling" position, no driving force is exerted on the driven member, but the driving member is free to continue turning without noise or effect. The rollers are held in such "free wheeling" position by one of the reset balls 36 which has entered the blind portion of the ball race as shown in dotted lines. The driver will deliver no further torque as long as the rollers and reset ball are in positions 16b and 36b respectively.

When the direction of rotation of the tool is reversed, as for removing a tap, the rollers will be moved from position 16b to 16c, and the reset ball controlling this cycle will be moved from position 36b to 36d by action of the friction coupling against the roller cage.

The same roller wedging action occurs in this reverse direction as occurred in the forward driving direction, and torque will be transmitted by the driver. If the external resisting torque in the reverse direction increases to an amount equal to or greater than that causing releasing of the tool in the forward direction the rollers will again over ride the high points on the cams or ridges and enter a relieved section 37 of the cam drive at position 16d. The rollers will be held here by action of the reset ball in the blind portion of the ball track at position 36e and the tool will be "free wheeling" in the reverse direction.

If over riding does not occur in reverse, then when the driver is again rotated in the forward direction, the rollers and the reset ball will be moved from positions 16c and 36d to positions 16e and 36e respectively, as shown in Figure 11, and the next reset ball in line will be moved into position 36a as shown in Figure 9, to control the next cycle. However, if over riding does occur in reverse, then in order to move the rollers and the reset balls from positions 16d and 36e to positions 16e and 36e respectively, the tool must be overridden in the forward direction. This may be done manually or automatically during the succeeding operation after which the tool will be in the ready position as shown in Figure 9.

From this description, it will be seen that we provide a simple and efficient safe torque driver capable of driving, releasing and reverse driving and resetting as above described. In this type of driver having a multiplicity of rollers, a relatively large torque range is available. Variation in the driving force is accomplished by axial movement of the driven member with respect to the driving member which is accomplished by turning the sleeve 23 in the desired direction. Such movement of the driven member increases or decreases the radial distance between the driving and driven members thereby creating more, or less, pressure on the driving rollers as they wedge between the tapered portion of the driving shell and tapered portion of the driven member which carries the cams.

In order to hold the members in adjusted position, we provide a cylindrical shell 38 which fits freely over the driven member and the enlarged end 22 of the sleeve 23. This sleeve is provided with gear teeth 39 which are long enough to engage with similar teeth 40 on the driving member and 41 on the sleeve portion 22. The sleeve has an inner shoulder 42 which engages with a similar shoulder 43 on the ring or enlarged portion 22 and the sleeve is held in adjusted position by means of a retaining ring 44 which engages with a peripheral slot 45 in the sleeve.

It will be particularly pointed out that the function of the reset balls which coact with the groove means to lock the cage to the driven member during certain phases of the operation of the device is to provide a lock-out means so that when the rollers are released due to overload, they will remain in released or free wheeling position regardless of the continuous rotation of the driving shaft until the device is re-cycled which requires reversal of rotation of the driving shaft.

We claim:

1. A torque driver for taps or other tools having a deformable elastic metal driving shell formed of a single piece, means for attaching the shell to a means for turning the same, said shell having a tapered bore which is largest at the open end of the shell, a driven member mounted in the shell and having a tapered portion which is complementary to the tapered bore of the driving shell, longitudinal cams on the tapered portions of the driven member, driving rollers mounted between the tapered surfaces of said driving and driven members, which deform the shell when the resistance on the driven member exceeds a predetermined amount and means for axially adjusting the driven member with respect to the driving member to regulate the amount of torque to be delivered to the driven member.

2. In a multi-roller safe torque driver, the combination of an integral deformable elastic cup-shaped driving member formed of resilient metal and having a conical bore and which is adapted to return to normal position after being deformed, means for connecting the driving member to a driving means, a driven member rotatably and axially movably mounted in the driving member having a conical section with longitudinal cams thereon, driving rollers engaging with the conical portions of the driving and driven members, and means for adjusting the driven member axially with respect to the driving member which coact with the cams to deform the driving member under predetermined resistance.

3. In a multi-roller safe torque driver, for taps or other tools, the combination of a unitary resilient driving cylinder having a tapered bore, a driven member in the cylinder having a tapered portion opposed to the bore and having a plurality of longitudinal cams thereon, means for adjusting the driven member axially with respect to the driving cylinder, rollers positioned between the cammed portion of the driven member and the tapered portion of the driving member which are adapted to drive the driven member when engaging with said cams and to release the driven member under predetermined torque and become free wheeling when opposed to certain areas between the cams in the driven member, a cage for the rollers, and ball and groove means for holding the cage in predetermined circumferential positions with respect to the driven member.

4. In a multi-roller safe torque driver, the combination of an integrally formed, deformable driving shell, a driven member mounted in the driving shell and having longitudinal cams thereon, rollers adapted to coact with the driving and driven members through said cams, a roller cage positioned between said members, a tortuous ball track in the driven member adjacent to the cage, reset balls movable in the track and engaging with grooves in the cage, there being one ball and groove for each roller, said ball and groove means being adapted to hold the cage and rollers in predetermined position with respect to the driven member.

5. In a safe torque driver, the combination of a driving member, a driven member mounted in the driving member and having longitudinal ridges and depressed portions between the ridges, rollers between the members coacting therewith, a cage for said rollers having slots in one end in alignment with the rollers, balls in said slots, said driven member having a circumferential groove for said balls adapted to control the balls and lock the cage in predetermined position.

6. A torque driver having a driving shell with a tapered bore, a driven member mounted in the driving member and having a tapered portion opposed to the tapered bore, rollers between said tapered portions, a sleeve having threaded engagement with the driving member and connected with the driven member for adjusting the same axially, circumferential teeth on the driving member, circumferential teeth on the adjusting sleeve, a shell fitting over said members and having teeth for engagement with said circumferential teeth, and means for fastening the adjusting shell in position.

7. A roller drive, comprising a driving shell, a driven member mounted in said shell and having driving cams, rollers between the driving member and driven member, a cage for said rollers, longitudinal slots in the cage at the end thereof, there being one slot for each roller, balls mounted in said slots, a tortuous ball raceway in the driven member which coacts with said balls for holding the cage in predetermined positions.

References Cited in the file of this patent

UNITED STATES PATENTS

| | | |
|---|---|---|
| 445,615 | Rathbun | Feb. 3, 1891 |
| 717,199 | Hollm | Dec. 30, 1902 |
| 1,092,574 | Jansson | Apr. 7, 1914 |
| 1,881,633 | Johnson | Oct. 11, 1932 |
| 2,065,244 | Richards | Dec. 22, 1936 |
| 2,250,736 | Torresen | July 29, 1941 |
| 2,441,038 | Siesel | May 4, 1948 |
| 2,461,447 | Siesel | Feb. 8, 1949 |
| 2,593,907 | Marshall | Apr. 22, 1952 |
| 2,632,485 | Peck | Mar. 24, 1953 |
| 2,708,836 | Stuart | May 24, 1955 |
| 2,771,804 | Better et al. | Nov. 27, 1956 |

FOREIGN PATENTS

| | | |
|---|---|---|
| 358,617 | Great Britain | Oct. 15, 1931 |